3,138,862
METHOD OF JOINING FERROUS METAL PARTS
George H. Robinson, St. Clair Shores, Mich., assignor to General Motors Corporation, Detroit, Mich., a corporation of Delaware
No Drawing. Filed Sept. 6, 1960, Ser. No. 53,917
4 Claims. (Cl. 29—487)

This invention relates to the art of joining metals and more particularly to the brazing of low carbon ferrous metal parts such as steel.

Ferrous metal parts brazed by conventional brazing alloys such as those containing copper or brass as a principal metal constituent are not suitable for some uses because of the adverse effects of the dissimilar metals forming the joint. For example, a joint of this type formed of dissimilar metals may be highly susceptible to electrolytic corrosion in some environments. Moreover, a joint of this type has limited strength at elevated temperatures since the strength of the joint is limited by the relatively low melting point of the brazing material.

It is an object of this invention to provide an article comprising ferrous metal parts joined by brazing in which the metallographical structure of the joint also consists of a ferrous metal which has a similar chemical composition to that of the ferrous metal parts which are joined. It is a further object of this invention to provide a method of brazing low carbon ferrous metal parts in which the resulting joint has a metallographic structure and chemical composition which are similar to that of the parts being brazed whereby electrolytic corrosion in the joint is avoided and the hot strength of the joint is markedly improved.

These and other objects of the invention are accomplished by placing between the parts to be joined in contacting relationship a powdered graphite and iron mixture in which the carbon content is somewhat greater than the eutectic proportion of carbon in an iron-carbon alloy system, then heating the resulting sandwich at the interface of the parts to a temperature in excess of 2070° F. and preferably to about 2200° F. in a neutral or reducing atmosphere for a time sufficient to cause the powdered carbon of the mixture to diffuse into the powdered iron to form an alloy composition of iron and carbon of eutectic proportions and to cause a melting of this eutectic alloy, and further to cause the residual undiffused carbon in the brazing mixture to diffuse into the adjacent surfaces of the metal parts to be joined to likewise form surface layers of eutectic proportions and a melting thereof. The heating is continued for a time sufficient to cause the carbon to continue diffusing into the parts to be joined whereby a joint having a carbon content substantially below 4.3% carbon is formed and the melting temperature of the metal of the joint is raised to a temperature greater than the temperature of the interface to cause a solidification of the joint and preferably until the carbon content of the joint is on the same order of that of the parts to be joined. Satisfactory results are obtained when using brazing temperatures between about 2150° F. and 2250° F.

Other objects and advantages of this invention will be apparent from the detailed description of the invention set out hereinafter.

The brazing method of the present invention is particularly useful for joining together low carbon ferrous metals such as steels which consist principally of iron and include relatively small amounts of carbon. Illustrative of these steels are low carbon steels containing about 0.10% to about 0.3% carbon, medium carbon steels containing about 0.3% to about 0.5% carbon, and high carbon steels containing about 0.5% to about 1.0% carbon. Higher carbon ferrous metals may also be brazed by means of the process of this invention as will be apparent from the following description thereof.

A detailed description of the process of this invention will now be made in terms of brazing together a pair of sheets of SAE 1030 steel having the nominal composition of about 0.28% to 0.34% carbon, about 0.60% to 0.90% manganese, 0.04% phosphorus maximum, 0.05% sulfur maximum and the balance substantially iron. A brazing material is prepared which consists of a mixture of powdered iron and powdered graphite in which the carbon content is somewhat in excess of the eutectic proportions of 4.3% by weight carbon and preferably about 5.5% carbon.

The powdered iron may be of a particle size which will pass through a 200 or 250 mesh screen and the powdered graphite may be of similar fineness. The particle size of these constituents may beneficially be of greater fineness since the use of finer iron and graphite powder will increase the speed of eutectic formation and the brazing operation as will be apparent hereinafter. However, a particle size of 200 to 250 mesh is readily available and has been found to operate satisfactorily. A particle size of greater than 200 mesh may also be used if speed of brazing is not an important consideration. The powdered iron and the graphite are thoroughly mixed and then dispersed in a suitable vehicle or carrier to form a relatively thin paste which may be applied to a metal surface evenly and efficiently. Organic vehicles such as polyvinyl acetate have also been found satisfactory for this purpose. Water has been found to be an entirely satisfactory vehicle. A desirable vehicle for this purpose is merely one by which the powdered material can be efficiently and conveniently applied to the surfaces to be joined and which will evaporate in the brazing process so as not to leave any residue in the brazed joint. The carbon content of the brazing mixture must be sufficient to at least form an alloy of eutectic proportions on being fused with iron. A powdered composition containing about 5.5% by weight carbon and the balance iron has been found to produce optimum results in the brazing method of this invention. The carbon content of the brazing mixture may be as high as 15% by weight with satisfactory results.

In accordance with the process of this invention, the surfaces to be joined are first cleaned and degreased. Any conventional degreasing and cleaning process may be used for this purpose. A layer of about 0.02 inch in thickness of the brazing mixture contained in the aqueous vehicle is then applied to one surface of the steel sheet and thereafter the second sheet is laid over the layer of brazing material to form a sandwich-like structure.

Next, the sandwich interface is subjected to heat at a temperature of 2200° F. in a hydrogen atmosphere. Other well known reducing or neutral atmospheres may be used for this purpose.

During the initial phases of the heating process the powdered carbon diffuses into the iron particles until a eutectic composition of 4.3% carbon and the balance substantially iron is formed. This eutectic composition has a melting point of 2070° F. and accordingly readily melts at the brazing temperature of 2200° F. The excess carbon remaining in the joint diffuses into the adjacent ferrous metal sheets being joined until a eutectic iron composition is also formed at the abutting surfaces of the steel sheets. This surface layer likewise melts and flows into the molten eutectic iron-carbon alloy formed between the abutting surfaces of the sheets being brazed. As the heating continues, the carbon continues to diffuse into the steel sheets whereby the carbon content of the alloy decreases and the melting point thereof rises. This change in the chemical composition of the alloy continues until the carbon content of the joint is lowered sufficiently to cause the metal to solidify and form a brazed joint. A heating period of about three minutes is usually required to obtain a satisfactory joint. However, longer heating cycles in the neighborhood of 30 minutes are sometimes required to cause a sufficient diffusion of the carbon into the metal of the parts to be joined so that the composition of the joint is approximately the same as that of the parts to be joined. In some instances as where the time of the brazing cycle is not an important consideration, a brazed joint may be effected by using substantially all powdered graphite as a brazing material and subjecting the parts to be joined to heat for a sufficient time to cause diffusion of the carbon to the adjacent ferrous metal to form an alloy of eutectic proportions.

After heating the aforedescribed sandwich for about three minutes, sufficient carbon has diffused from the brazing alloy into the adjacent steel surfaces to form a medium steel joint of about 0.015 to 0.02 inch in thickness containing about 0.4% carbon and having a melting point of about 2700° F. to 2800° F. In general the aforedescribed brazing procedure is effective in joining steel parts by means of a joint having substantially the same chemical composition and having a slightly greater carbon content in the neighborhood of about 0.1 to 0.2 percentage points than the steel parts which are joined thereby. Thus, steel parts containing about 0.3% carbon will have a joint containing about 0.4% to 0.5% carbon.

The brazing temperatures of about 2200° F. involved in the process of this invention compare favorably with the melting point of copper of approximately 1980° F. which is employed in typical brazing alloys. However, a joint is formed which has a melting point in the vicinity of 2800° F., a temperature greatly in excess of the melting point of the conventional copper brazed joints. This brazed joint, therefore, has an elevated temperature strength which is far greater than those obtained by the use of conventional copper-type brazing alloys and it is obtained at brazing temperatures which are in the neighborhood of brazing temperatures of the conventional copper-type brazing alloys.

The heating step of the method of this invention may be performed by any well known method. Since the brazing operation is performed in a neutral or reducing atmosphere, the heating is preferably accomplished in a furnace furnished with the neutral or reducing atmosphere. However, heat may be applied by other means such as induction heating and the like.

While the invention has been described by means of certain specific examples, it is to be understood that the scope of the invention is not to be limited thereby except as defined in the following claims.

I claim:

1. In a method for brazing steel parts containing about 1% by weight carbon or less the steps comprising dispersing a mixture of graphite and iron powders consisting of 4.3% to about 15% by weight carbon and the balance substantially iron in a liquid vehicle to form a brazing material of paste-like consistency, applying a layer of said brazing material between the steel parts to be joined, heating said brazing material and the adjacent steel parts to a temperature in a range of about 2150° F. and 2250° F for a time sufficient to cause said carbon to diffuse into said iron of said material and form a molten eutectic alloy and to cause carbon from said material to likewise diffuse into the adjacent steel parts and form a surface eutectic alloy thereon and on further heating to cause further diffusion of the carbon into the adjacent steel parts thereby reducing the carbon content of said alloy below eutectic proportions whereby the melting point of the alloy is caused to rise and the molten metal is caused to solidify.

2. In a method for brazing steel parts containing about 1% by weight carbon or less the steps comprising dispersing a mixture of graphite and iron powders consisting of about 5.5% by weight carbon and the balance substantially all iron in a liquid vehicle to form a brazing material of paste-like consistency, applying a layer of said brazing material between the steel parts to be joined, heating said brazing material and the adjacent steel parts to a temperature in the neighborhood of about 2200° F. for a time sufficient to cause said carbon to diffuse into said iron of said material and form a molten eutectic alloy and to cause carbon from said material to likewise diffuse into the adjacent steel parts and form a surface eutectic alloy thereon and on further heating to cause further diffusion of the carbon into the adjacent steel parts thereby reducing the carbon content of said alloy below eutectic proportions whereby the melting point of the alloy is caused to rise and the molten metal is caused to solidify.

3. In a method for brazing steel parts containing about 1% carbon or less the steps comprising dispersing a mixture of graphite and iron powders in a liquid vehicle to form a brazing material of paste-like consistency, said mixture consisting of 4.3% to about 15% carbon by weight and the balance substantially all iron, applying a layer of said brazing material between the steel parts to be joined, heating said brazing material and the adjacent steel parts to a temperature in the range of about 2150° F. to 2250° F. for a time sufficient to cause said carbon to diffuse into said iron of said material and form a molten eutectic alloy and to cause carbon from said material to likewise diffuse into the adjacent steel parts and form a surface eutectic alloy thereon and on further heating to cause further diffusion of the carbon into the adjacent steel parts thereby reducing the carbon content of said alloy below eutectic proportions whereby the melting point of the alloy is caused to rise and the molten metal is caused to solidify, and continuing said heating for a time sufficient to cause said carbon to diffuse further into said steel parts whereby the brazed joint is of approximately the same composition as the said steel parts.

4. In a method for brazing steel parts containing about 1% carbon or less the steps comprising dispersing a mixture of graphite and iron powders in a liquid vehicle to form a brazing mixture of paste-like consistency, said mixture consisting of 4.3% to about 15% carbon by weight and the balance substantially all iron, applying a layer of said brazing material between the steel parts to be joined, heating said brazing material and the adjacent steel parts to a temperature in the range of about 2150° F. to 2250° F. for a time sufficient to cause said carbon to diffuse into said iron of said material and form a molten eutectic alloy and to cause carbon from said material to likewise diffuse into the adjacent steel parts and form a surface eutectic alloy thereon and on further heating to cause further diffusion of the carbon into the adjacent steel parts thereby reducing the carbon content of said alloy below eutectic proportions whereby the melting point of the alloy is caused to rise and the molten metal is caused to solidify, and continuing said heating for a time sufficient to cause said carbon to diffuse further into said steel part whereby the carbon content of the brazed joint does not differ from the said parts by more than about 0.2%.

References Cited in the file of this patent

UNITED STATES PATENTS

| | | |
|---|---|---|
| 898,979 | Kuzel | Sept. 15, 1908 |
| 1,924,528 | Waltenberg | Aug. 29, 1933 |
| 2,438,759 | Liebowitz | Mar. 30, 1948 |
| 2,725,287 | Cronin | Nov. 29, 1955 |
| 3,024,109 | Hoppin et al. | Mar. 6, 1962 |

FOREIGN PATENTS

| | | |
|---|---|---|
| 487,263 | Great Britain | June 17, 1938 |